United States Patent [19]

Raiser et al.

[11] Patent Number: 5,319,709
[45] Date of Patent: Jun. 7, 1994

[54] SYSTEM FOR BROADBAND DESCRAMBLING OF SYNC SUPPRESSED TELEVISION SIGNALS

[75] Inventors: James E. Raiser, Lilburn; Julius B. Bagley, Marietta; Michael T. Hayashi, Lawrenceville; Michael P. Harney, Atlanta; James O. Farmer, Lilburn; Kinney C. Bacon; Alex M. Cook, Jr., both of Lawrenceville, all of Ga.

[73] Assignee: Scientific-Atlanta, Inc., Atlanta, Ga.

[21] Appl. No.: 715,080

[22] Filed: Jun. 13, 1991

[51] Int. Cl.$^5$ ............................................. H04N 7/167
[52] U.S. Cl. ........................................ 380/15; 380/20
[58] Field of Search ............................. 380/15, 20, 19

[56] References Cited

U.S. PATENT DOCUMENTS

| | | | |
|---|---|---|---|
| 3,530,232 | 9/1970 | Reiter et al. | 380/15 |
| 3,789,131 | 1/1974 | Harney | 380/20 |
| 4,450,481 | 5/1984 | Dickinson | 380/20 |
| 4,466,017 | 8/1984 | Banker | 358/120 |
| 4,471,380 | 9/1984 | Mobley | 358/120 |
| 4,790,010 | 6/1988 | Sgrignoli | 380/15 |
| 4,920,566 | 4/1990 | Robbins et al. | 380/19 |
| 4,922,532 | 5/1990 | Farmer et al. | 380/15 |
| 5,029,340 | 7/1991 | Hashimoto | 380/15 |
| 5,113,441 | 5/1992 | Harada | 380/15 |

OTHER PUBLICATIONS

Operational Characteristics of Modern Set-Top Terminals, Jun. 4, 1984 J. O. Farmer.
General Instrument, Jerrold Starpack Pay Tv Security System, F1-F2, Jan. 1980.
General Instrument, Jerrold Starpack Multi-Level Pay Security System-300 MHz, F3-F4, Jan. 1980.

Primary Examiner—Stephen C. Buczinski
Attorney, Agent, or Firm—Banner, Birch, McKie & Beckett

[57] ABSTRACT

A television system having sync suppression scrambling and descrambling which includes in band and out of band signaling methods. The in band signaling method modulates the IF sound carrier of a premium video channel with timing and data pulses while the out of band signaling method modulates the previously modulated IF sound on a separate carrier onto a separate out of band data carrier. The in band signaling method uses a descrambler which tunes a channel before demodulating the timing and data pulses from the sound carrier while the out of band signaling method tunes a selected data carrier to demodulate the timing and data pulses. In both methods, the timing pulses are used to restore the levels of the synchronization pulses in the sync suppressed video signal, and thus descramble the signal, while the data pulses are used for addressable messaging to the descrambler including authorization. The out of band descrambler provides broadband sync restoration for a particular channel and thus does not need a broadband tuner for the video signal.

7 Claims, 12 Drawing Sheets

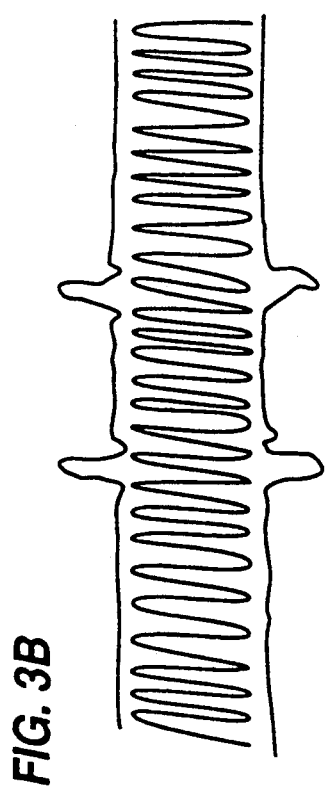
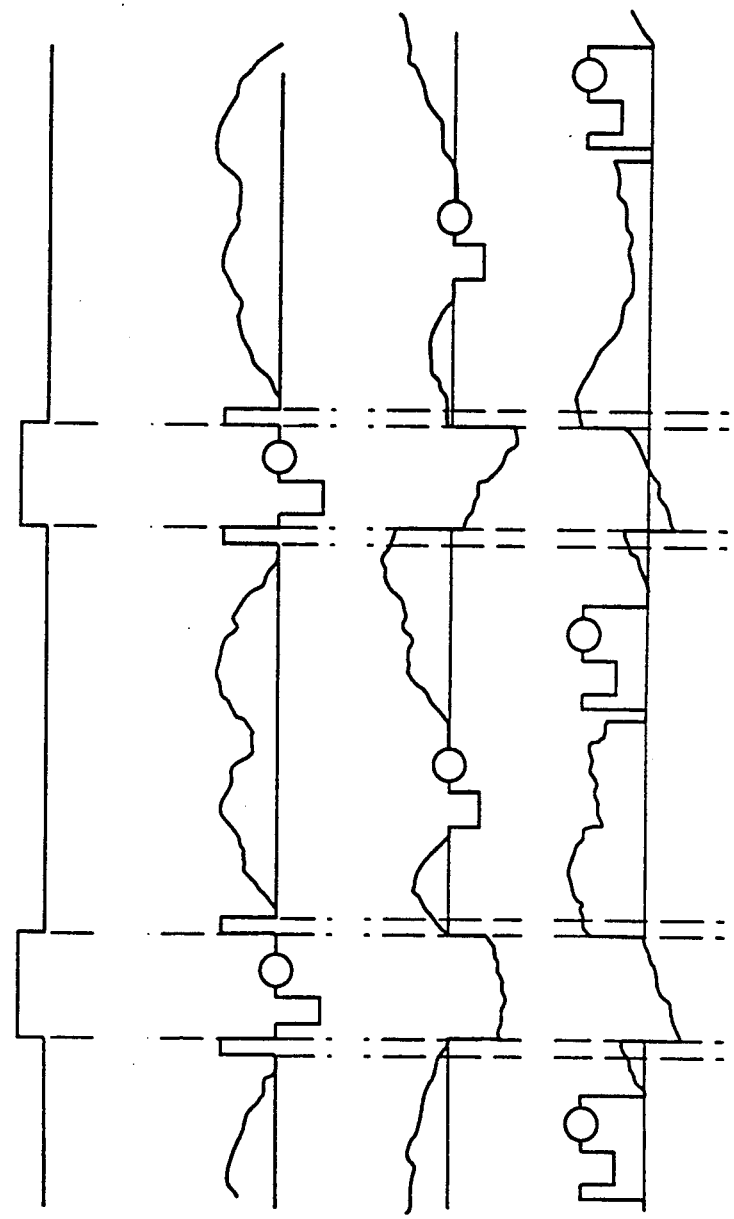
FIG. 3B
FIG. 4A
FIG. 4B
FIG. 4C
FIG. 4D

SYSTEM FOR BROADBAND DESCRAMBLING OF SYNC SUPPRESSED TELEVISION SIGNALS

FIELD OF THE INVENTION

The invention pertains generally to subscription television systems using sync suppression scrambling and descrambling which distorts TV signals when displayed, except at authorized receivers which are equipped with descramblers, and, more particularly, is directed to broadband descrambling of sync suppressed TV signals.

BACKGROUND OF THE INVENTION

Although the invention is not necessarily limited thereto, it is particularly suitable for use and transmission of subscription TV programs by cable systems. The invention may also be applied wherever sync suppression scrambling and descrambling of television signals is used whether the transmission link is a cable, broadcast, or satellite link.

Sync suppression scrambling and descrambling of television signals is a well known and accepted technique for encoding and decoding subscription television signals where the amplitude of the vertical or horizontal synchronizing (sync) signals, or both, is attenuated so as to prevent a television receiver from locking onto the signal. The picture received by a subscriber receiver not equipped with a descrambler rolls and is so distorted so as to make viewing impossible or uncomfortable. Reference may be had to U.S. Pat. No. 4,466,017 issued to Robert Banker on Aug. 14, 1984 for further information as to sync suppression scrambling and descrambling of television signals. The disclosure of Banker is incorporated herein by reference.

Briefly described, sync suppression scrambling and descrambling of TV signals for subscription TV programs may be carried on by generating sync suppression pulses in overlapping time relationship with the horizontal and/or vertical sync pulses of the TV signal. Timing pulses are generated in selected time relationship with the sync suppression pulses such that each of the timing pulses and the sync suppression pulses have a selected time delay with respect to each other. This time delay may be selected, preferably digitally, from a plurality of different delays or dynamically varied. The horizontal and/or vertical sync pulses in the television signal are thereby suppressed below their normal amplitude. Sync detectors of conventional TV receivers at the subscriber are incapable of locking onto the attenuated sync pulses of the transmitted television signal. The timing pulses are transmitted with the TV signals, preferably by modulating the IF audio carrier thereof, during encoding of the TV signals. Scrambled and encoded TV signals are transmitted from a transmitting station which may be, for example, the headend of a cable TV system, to the receiving stations.

The timing pulses are derived at these receiving stations and the selected delay added to generate delayed timing pulses. Then restoring pulses are generated in proper overlapping time relationship with the received horizontal sync pulses upon the occurrence of the delayed timing pulses. The TV signals are restorable to normal amplitude through the use of the restoring pulses to descramble the TV signals. Therefore, the receiving station to restore the pulses in synchronism with the horizontal sync intervals of the TV signals must be not only authorized to receive the scrambled signals but also be tuned to the particular premium channel which is scrambled. Other premium channels which are scrambled are usually out of phase with a particular timing signal and cannot be descrambled without being tuned. In the past the duplication of the tuner in a converter/descrambler and a cable ready TV was considered inevitable.

After tuning in the particular TV premium channel which is to be descrambled and decoding the timing pulses, the descrambling process is one of restoring the horizontal sync pulses to their original level relative to the rest of the TV signal. This is generally accomplished by a controlled impedance device, either an attenuator or an amplifier, which is placed in series with the signal and at the correct times switched on and off to vary its impedance and thus the amplitude of the synchronization pulses relative to the rest of the signal.

Conventional descramblers used in subscription cable television to descramble the sync suppression signals from a headend usually contain a converter or tuner. In many, the output frequency of the CATV converter is fixed, such as channels 2, 3, or 4, requiring that all channel changing must be done through the CATV converter. In addition, this is a redundant function where the CATV converter has a tuner whose operation closely duplicates that of the tuner in a cable ready television receiver and adds a significant increase to the cost of the CATV converter along with some degradation of the TV signal.

An additional problem in developing descramblers which are compatible with the present CATV systems is the compatibility of signaling methods. Authorization information and data for other operations are transmitted in band and out of band for various systems. An in band signaling system frequently utilizes the sound carrier by modulating it with timing and data pulses. This does not affect the sound, which is frequency modulated on the carrier. For out of band systems, a single FM modulated signal is set aside for authorization messages with no timing data included thereon. It would be highly advantageous for a descrambling apparatus to be compatible with the CATV system in which it is placed without having to replace other converters because of incompatible message protocols.

SUMMARY OF THE INVENTION

Accordingly, it is an object of the INVENTION to provide an improved television system utilizing sync suppression scrambling and descrambling.

It is another object of the invention to provide an improved television system utilizing sync suppression scrambling and descrambling which does not require the use of a broadband tuner prior to descrambling.

Yet another object of the invention is to provide an improved television system utilizing sync suppression scrambling and descrambling which descrambles one channel from a broadband television signal without the use of a broadband tuner.

Still another object of the invention is to provide an improved television system utilizing sync suppression scrambling and descrambling which provides the advantages of addressable descramblers without the expense of a broadband tuner prior to descrambling.

Another object of the invention is to provide an improved television system utilizing sync suppression scrambling and descrambling with an out of band signaling method compatible with present in band signaling methods.

Another object of the invention is to provide an improved subscriber terminal which can tune an out of band data carrier for descrambling and authorization data.

Another object of the invention is to provide an improved subscriber terminal which provides addressable functions and broadband descrambling without the expense of a broadband tuner.

Still yet another object of the invention is to provide an improved subscriber terminal which can be inexpensively used for selected individual premium events.

These objects are provided by the invention which comprises an improved television system utilizing sync suppression scrambling and descrambling. Preferably, at the headend of the television system there is disposed means for generating a broadband television signal which includes encoded or sync suppressed television signals (premium channels) and non-encoded television signals (basic cable channels).

The system uses two different types of scrambler processors for encoding the sync suppressed television signals. In one method, conventional in band scrambler processors as shown in the referenced Banker patent are used for encoding a first set of premium channels. The scrambler suppresses the sync pulses of the particular TV channel selected and provides timing pulses for their restoration. The timing and data information are encoded on the sound carrier of the television channel which has been scrambled by sync suppression.

In a second method, a group of out of band scrambler processors is used for encoding a second set of premium channels. In one preferred embodiment, the out of band scrambler processors generate the same scrambled television signal and in band signaling as do the in band scrambler processors. In addition to the standard encoding, the IF sound carrier of the scrambled television signal which additionally contains the timing and data pulses is modulated onto a separate data carrier. In another embodiment, the timing and data pulses can be directly amplitude modulated onto the data carrier. A third embodiment includes frequency modulating the timing and data pulses onto the data carrier.

A separate data carrier is associated with each of the out of band descrambler processors to generate a group of data carriers for the second set of premium channels. Preferably, this group of data carriers is chosen so they can be transmitted in the A-2 channel of a conventional broadband cable television signal. This channel is one of the least used channels of the spectrum and provides a convenient grouping for the data carriers. The illustrated embodiment uses eight frequency division multiplexed data carriers, from 108 MHz. to 114 MHz., to transmit the signaling information for eight premium channels.

The encoded and non-encoded television signals are combined into a broadband television signal and then transmitted over a communications link to a multiplicity of subscriber terminals. The subscriber terminals are of at least two types where one type is a conventional converter or a converter/descrambler. The conventional converter which contains a tuner can receive all the nonscrambled channels of the broadband television signal and possibly addressable data. The converter/descrambler can receive the nonscrambled channels and unscramble all scrambled channels for which authorization has been provided.

The second type of subscriber terminal is a tunerless terminal which descrambles those channels for which the out of band timing and data information has been provided. The subscriber terminal tunes to one of the data carriers to derive the timing and data information on the carrier. The subscriber terminal uses the timing data to descramble the associated television signal by broadband descrambling. The data on the carrier is used for authorization and event timing purposes.

The broadband descrambling is advantageous in that a broadband tuner which duplicates the function of a tuner for a cable ready TV is not needed thereby providing significant cost savings. The tuner necessary to tune the data carriers is considerably less complex than a broadband tuner since it must only cover one channel (6 MHz) rather than having to tune the entire cable spectrum (54 MHz to 550 MHz). The data carriers are advantageously grouped into a small portion of the spectrum so that the relatively expensive double IF conversion of a conventional wideband converter tuner is unnecessary.

In addition, the subscriber interface of the terminal is minimized to reduce the complexity of the terminal and to increase its ease of use. In the preferred embodiment, the subscriber terminal includes two control keys to switch the terminal between two main states, that of passing the broadband signal to a television receiver substantially unmodified and that of desiring to watch an event on one of the premium channels. During these two main states, the terminal automatically controls tuning a data carrier, descrambling and subscriber information displays based on a plurality of substrates defined by the authorization data.

In the preferred embodiment, the authorization data defines three substrates of having no events authorized, having an event authorized, and having an event active. The authorization data causes a shift between these substrates by sending a transaction addressed to a particular terminal at the occurrence of a predetermined circumstance. In the preferred implementation the terminal changes from a no event substate to an event authorized substate when an authorization transaction is received. The terminal changes from an event authorized substate to an event active substate when an event active transaction is received. The terminal changes from an event active substate to a no event substate when an event over transaction is received.

These and other objects, features, and aspects of the invention will be more fully understood and better described when the following detailed description is read in conjunction with the appended drawings wherein:

BRIEF DESCRIPTION OF THE DRAWINGS

FIGS. 3A and 3B are a pictorial representation of the out of band data and timing signaling method of the system illustrated in FIG. 1;

FIGS. 4A-4D are a pictorial representation of the broadband descrambling method of the system illustrated in FIG. 1;

DETAILED DESCRIPTION OF THE PREFERRED EMBODIMENTS

Figure 1:
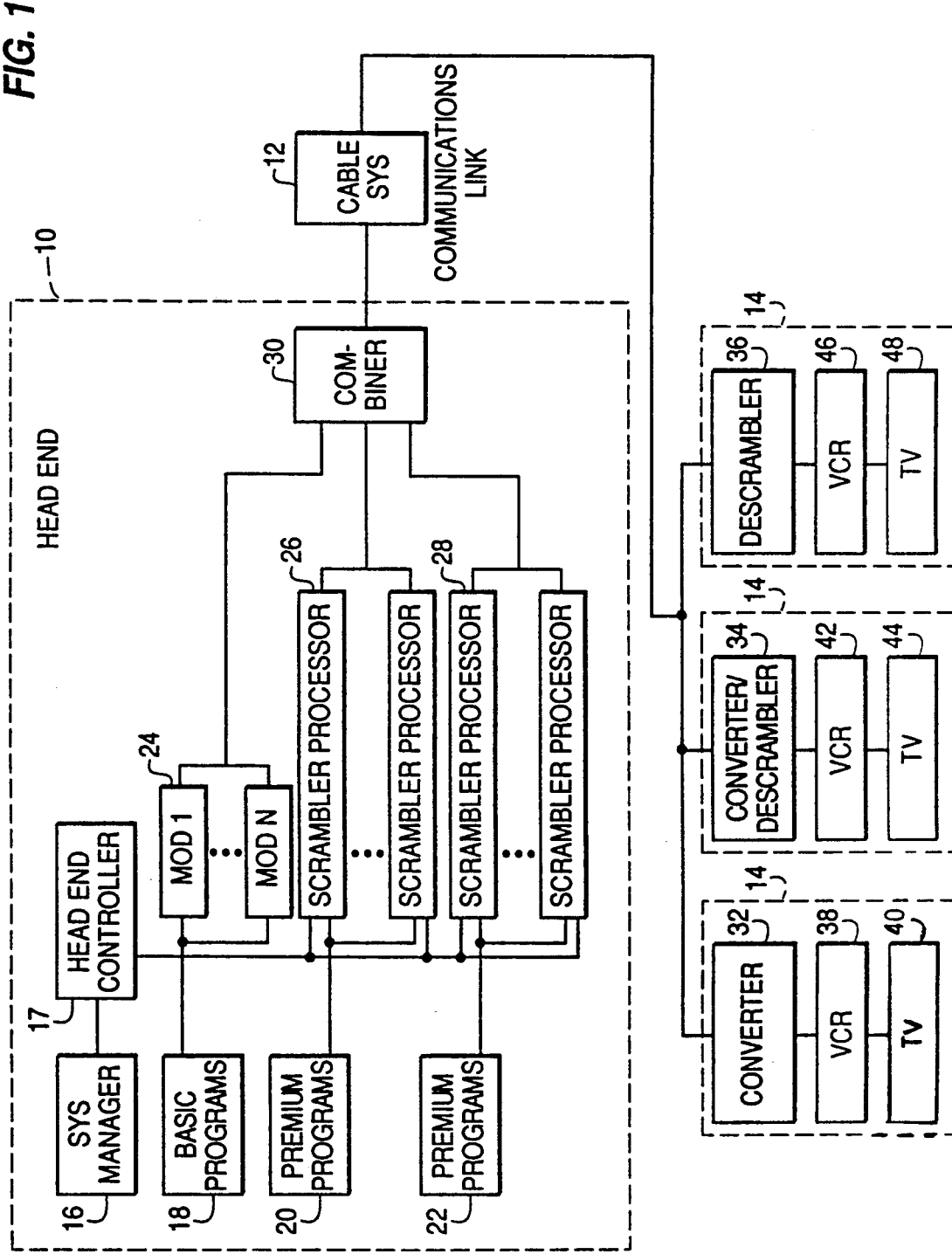
FIG. 1 is a system block diagram of a television system utilizing a sync suppression scrambling and descrambling method constructed in accordance with the invention.

FIG. 1 is a system block diagram of a sync suppression scrambling and descrambling television system constructed in accordance with the invention. The system comprises a headend 10 for transmitting a broadband television signal including a plurality of television signals on different channels. The broadband television signal includes programming on premium and non-premium channels. The broadband television signal is transmitted over a communications link 12, normally a CATV system, to a plurality of subscribers 14. The subscribers 14 pay extra to purchase programming on the premium channels and a basic service charge to purchase programming on the non-premium channels. To deny the premium services to those subscribers who are not authorized to receive them, the programming on premium channels is scrambled, in the present system by sync suppression scrambling.

A headend 10 of the television system includes a basic cable program generator 18, a first premium program generator 20, and a second premium program generator 22. These program generators may provide one or more television channels to modulators 24, and scrambler processors 26 and 28. The program generator 18 provides a single base band television signal to each of the modulators 24 which convert the signals to an assigned cable carrier frequencies. The premium program generator 20 provides a single base band television signal to each of the scrambler processors 26 which convert the signals to assigned cable carrier frequencies and scramble them by sync suppression. The signaling method of these processors 26 is in band by AM modulation of the IF sound carrier with timing and data pulses prior to up-conversion. The premium program generator 22 provides a single IF television signal to each of the scrambler processors 28 which convert the signals to assigned carrier frequencies and scramble them by sync suppression. The signaling method of these processors 28 is in band by AM modulation of the IF sound carrier with timing and data pulses prior to up-conversion. In addition, the processors 28 utilize an independent processing step to modulate the IF sound carrier containing the messaging onto an out of band data carrier. A system manager 16 through a headend controller 17 provides the addressable data for the in band and out of band signaling of the processors 26 and 28.

The scrambled and non-scrambled channels of the broadband television signal are transmitted to each of the subscribers 14. A subscriber 14 may have one of two types of subscriber terminal to receive the television channels which are transmitted over the cable system 12. The first type of subscriber terminal is a converter 32 or converter/descrambler 34. The terminals 32 and 34 both contain a tuner with which to select a channel and may or may not both contain addressable functions. The terminal 34, in addition to the functions of converter 32, contains a descrambler which is used to restore the suppressed sync pulses in the channel signal. The terminals 32 and 34 both use the in band signaling system from the headend 10.

Subscribers 14 having a converter 32 may only receive the basic cable programming channels because they do not have a means for descrambling. The subscribers 14 having a converter/descrambler 34 may receive the basic cable programming, and additionally the premium programming on the first set and second set of premium channels. The converter/descrambler 34 descrambles the first and second set of premium programs in the conventional manner by the in band signaling method.

The second type of subscriber terminal is a descrambler 36. A subscriber 14 having a descrambler 36, which does not have a tuner, may receive the basic cable programming and the second set of premium channels. The second set of premium channels are descrambled by the out of band signaling method.

Figure 2A:
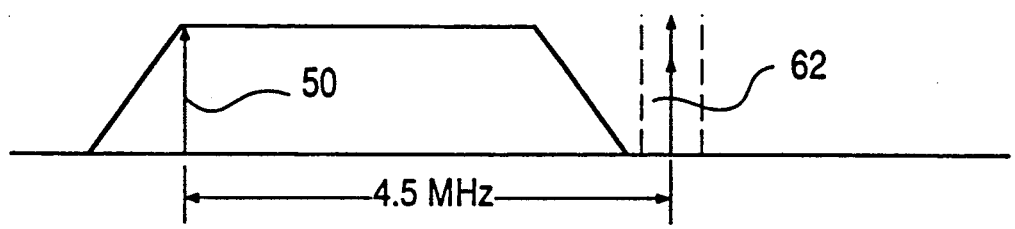
FIGS. 2A and 2B are a pictorial representation of the in band data and timing signaling method of the system illustrated in FIG. 1.
Figure 2B:
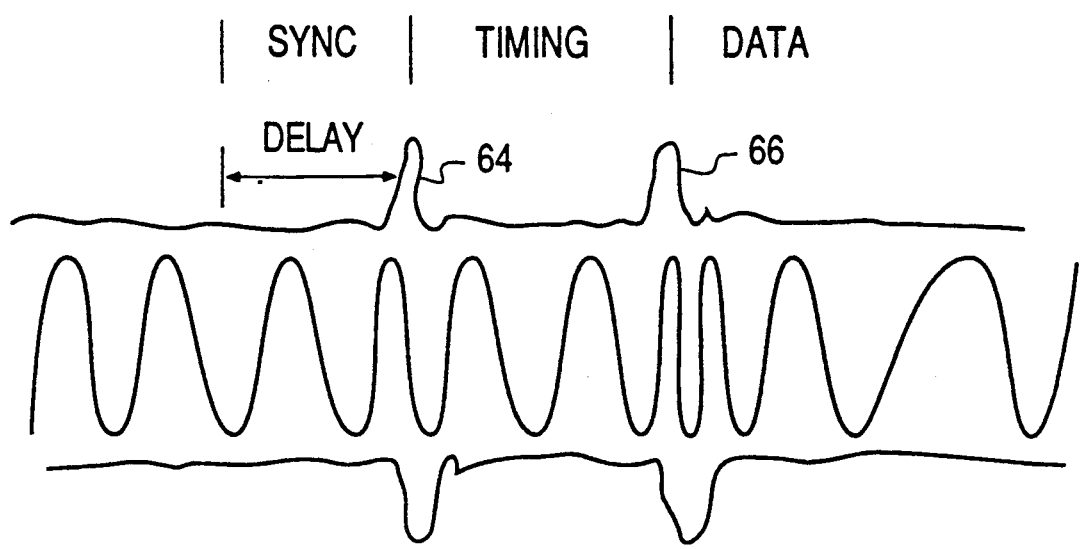

FIGS. 2A and 2B illustrate the in band signaling method of the present system where a typical channel is shown in FIG. 2A. The figure shows that the channel is 6 MHz wide and contains a video carrier 50 with video information modulated thereon (trapezoidal envelope). Located 4.5 MHz away from the video carrier is the audio subcarrier 62 which is FM modulated with sound information related to the video information on the video carrier 50. The audio carrier is additionally amplitude modulated with timing and data pulses.

FIG. 2B illustrates this modulation and shows the IF sound carrier (before up conversion to the audio subcarrier) with the frequency modulated sound information thereon. The IF sound carrier additionally has timing pulses 64 and data pulses 66 amplitude modulated on the IF carrier. The timing pulses occur once every horizontal line, a variable delay after the horizontal sync pulses to which they are associated. The data pulses are then a fixed amount of time later, being a logical one if present or a logical zero if not. The timing pulses are used to descramble the video signal while the data pulses are used for authorization transactions and to convey the rest of the timing information. This is the conventional in band signaling system as taught in the referenced Banker patent.

Figure 3A:
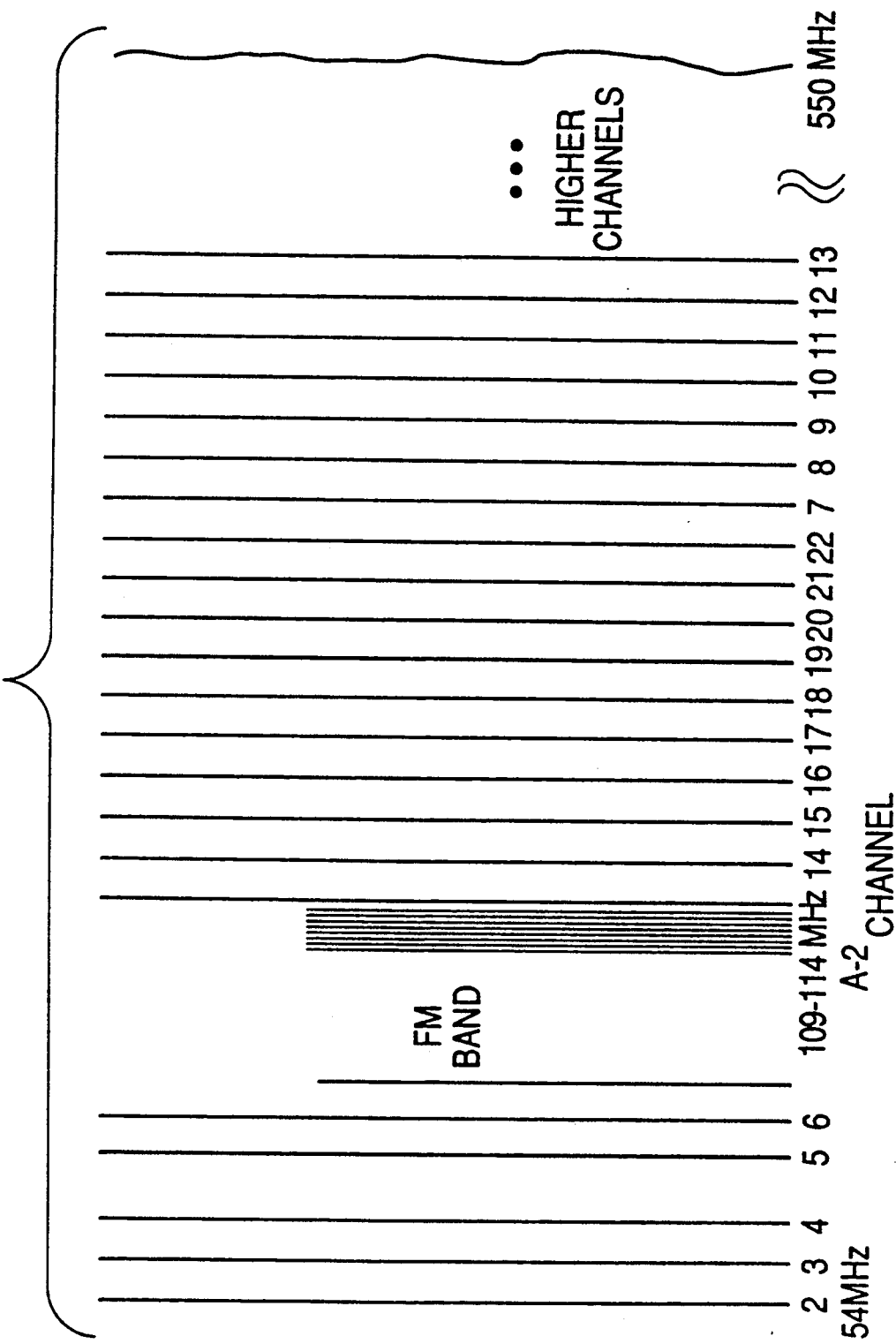

FIGS. 3A and 3B show the out of band signaling system of the present invention. FIG. 3A shows the spectrum of signals carried on a typical cable system. The channel numbers shown conform to the standard channel assignments developed by the Electronic Industries Association (IS-6). Illustrated in the figure are the low band picture carriers for channels 2-6, the FM band, 88-108 MHz, the A-2 channel (108-114 MHz) allocated for the data carriers of the present implementation, the mid band channel frequencies channels 14-22, and the high band frequencies for channels 7-13. The cable spectrum of course extends to higher frequencies and these are also used in conjunction with the invention. In many instances these higher frequencies are used for the premium channels as is recognized by those skilled in the art. The spectrum allocated for the out of band data carriers used in the present implementation is shown by way of example, not as a limitation. When reference is made to the data carrier it is understood that the data carrier includes both the addressing data and the timing information required to descramble.

FIG. 3B illustrates the preferred method of modulating the data carriers with timing and data information. Returning for a moment to FIG. 2B, it is noted that the IF sound signal of the in band signaling system contains all the timing and data information needed by the system just prior to its up conversion and in band placement. The present invention uses the elegant solution of taking this IF sound signal and upconverting it to a data carrier and then associating the data carrier with the channel. It is seen that the signal in FIG. 3B is essentially the same as the IF sound carrier of FIG. 2B except it is at the data carrier frequency.

FIG. 4 will now be more fully described with respect to the descrambling of a broadband television signal. By broadband descrambling what is meant is that the restoration pulses of the descrambling process are applied to a plurality of channels instead of just one. In conventional in band converter/descramblers, a channel has been tuned and converted to an IF or an output RF frequency before the timing and data pulses are detected. The timing pulses are thus inherently phased with the tuned signal and descrambling can take place directly. With the descrambling of a broadband television signal, the entire cable television spectrum is subjected to the level adjustment of the sync restoration process simultaneously. However, only one of the channels can be descrambled at a time as it is necessary to associate a channel with the correctly phased timing pulses.

In FIG. 4, there is shown several channels of a broadband television signal including scrambled and non-scrambled channels in their usual timed relationship. The restoration pulses (waveform A) derived from the timing pulses of one of the sync suppressed channels (waveform B) are shown relative to the video waveforms after descrambling for that channel and other channels (waveforms C and D) of the broadband television signal. Waveform C previously was a non-scrambled channel and waveform D another scrambled channel. The restoration pulses because they are in the correct phase to the television signal for an associated channel will produce an unscrambled television channel (waveform B). It is evident that the basic or non-scrambled channels do not have associated timing pulses and, if the restoration pulses of waveform A are applied to such a channel, then the result will be a garbled channel as seen by waveform C. Likewise the application of the restoration pulses of one channel to another scrambled channel without the correct phasing will cause a garbled signal as seen in waveform D.

Generally, the synchronization or blanking intervals of the channels do not normally occur in phase, so that a periodic level adjustment to restore the sync level of one signal (waveform A) will scramble the other signals more, since the restoration pulses will be out of phase with them. In the present invention, the out of band signaling method has each data carrier associated with a particular channel and the timing pulses phased thereon to descramble only that channel. Detection of that data carrier and the level adjustment of the broadband signal based on its detection will descramble the associated television channel and no other because of the normal phase difference between the blanking intervals of the channels.

However, it should be noted that more than one signal can be descrambled by broadband descrambling by correctly phasing the signals when the television channels are transmitted. This is accomplished in a known manner at the headend by a synchronizer so that several channels can be descrambled simultaneously by one data carrier. This process is advantageous when a package of channels is sold by the cable operator. The terminal will then indicate a primary channel number to tune a television receiver to but the subscriber will be notified that this channel and the others in the package can be watched.

Figure 5:
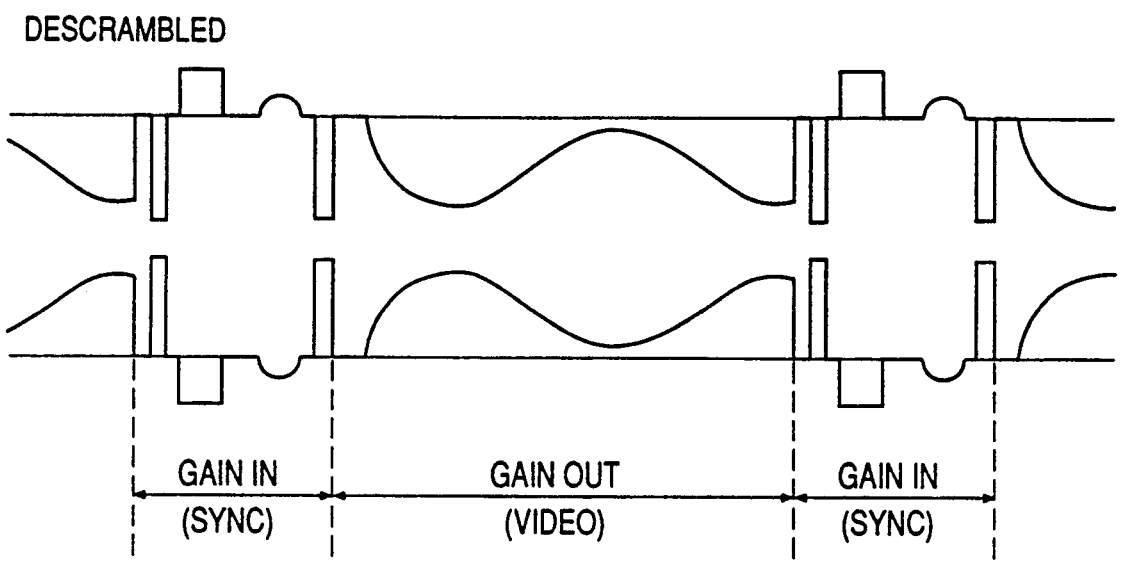
FIG. 5 is a pictorial representation of one of the preferred methods of sync restoration for the system illustrated in FIG. 1.
Figure 6:
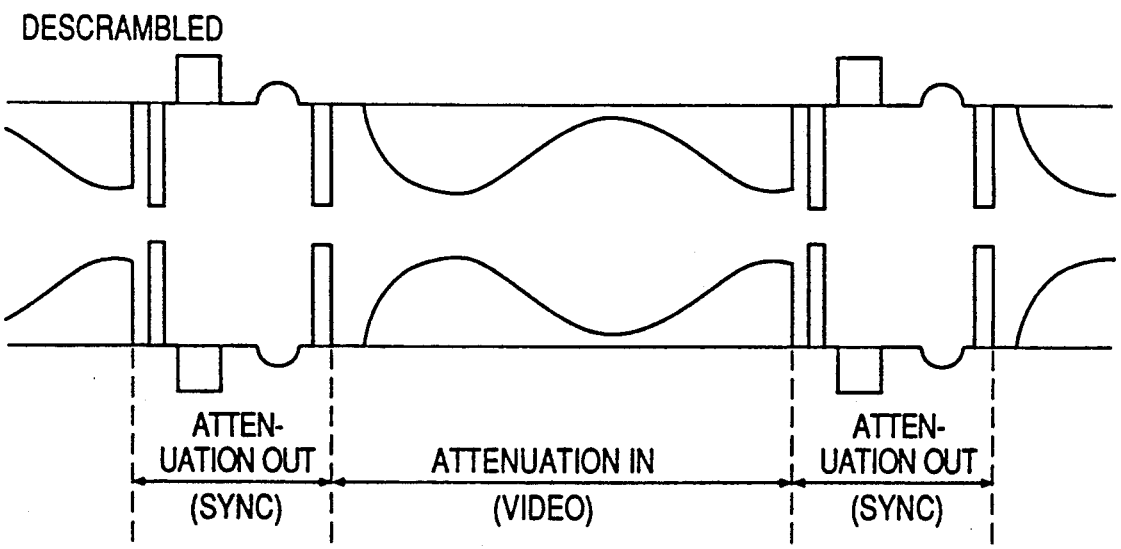
FIG. 6 is a pictorial representation of another of the preferred methods for sync restoration for the system illustrated in FIG. 1.

FIGS. 5 and 6 disclose preferred methods of broadband descrambling a multichannel signal. FIG. 5 discloses that the television signal can be descrambled by the application of gain during the sync periods and the switching off of the gain during the active video portions of the signal. Such action increases the level of the sync pulses relative to the active video thereby restoring their normal relationship. Alternatively, the active video portion of the signal can be attenuated and the attenuation discontinued during sync intervals as taught in FIG. 6. This process decreases the active video portion of the signal relative to the sync portion thereby restoring their normal relationship. Either of these methods, or any other method of descrambling which restores the relative relationship of the suppressed portion of the television signal to the unsuppressed portion, is acceptable for use in the present system.

Figure 7:
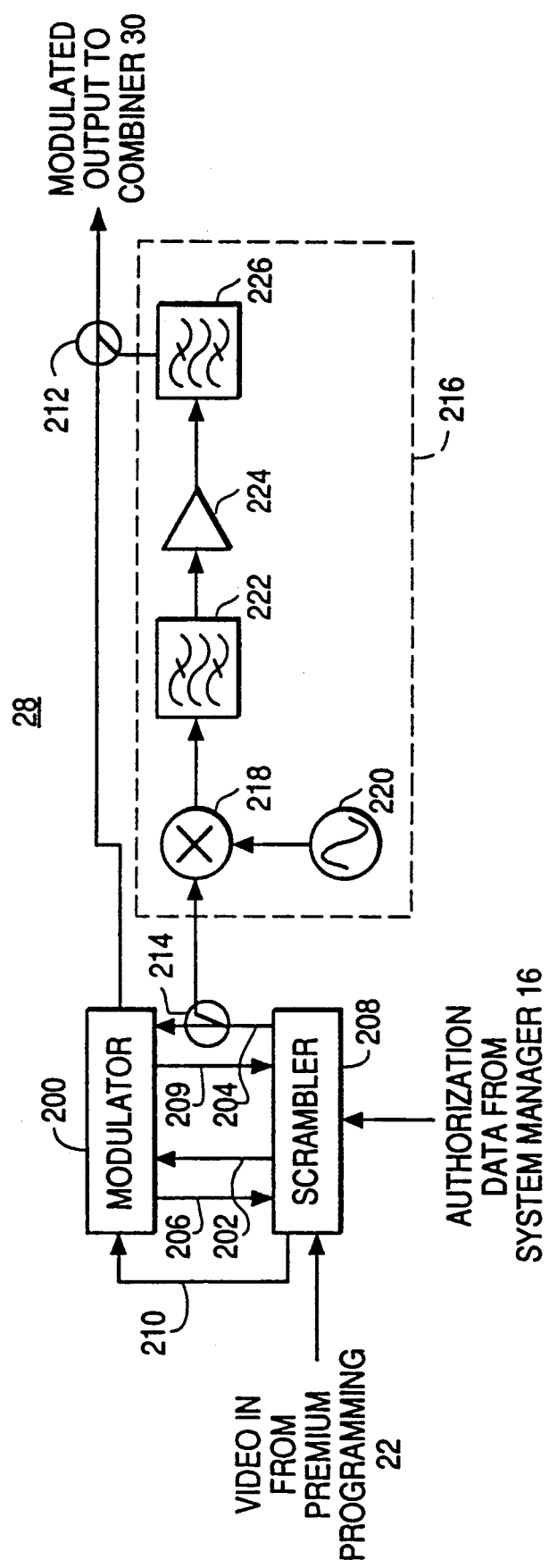
FIG. 7 is a detailed block diagram of an out of band scrambler processor for the system illustrated in FIG. 1.

A detailed block diagram of the descrambler processor 28 which scrambles a premium channel and produces timing and authorization data for the out of band signaling system is more fully illustrated in FIG. 7. Typical of sync suppressed signal processors, a modulator 200 converts the baseband video and audio signals to an RF channel frequency assigned by the cable system to the premium channel. Modulated video IF and audio IF respectively are passed from the modulator 200 to the scrambler 208, via connections 206 and 209. The scrambler 208 suppresses the sync pulses on the video IF and passes the suppressed video IF back to the modulator 200 on line 202. The scrambler 208 adds timing and data pulses to the IF sound signal, returning the resultant signal to the modulator 200 via connection 204. Video from premium programmer 22 is routed through the scrambler 208 which derives the timing information from the video signal. The video is then transmitted to the modulator 200 via connection 210. The scrambler 208 works in conjunction then with the modulator 200 to scramble the video channel by sync suppression in a well known manner.

The output of the modulator 200 is a standard scrambled signal using sync suppression as the scrambling method and having in band timing and data pulses on the sound carrier as described in the referenced Banker patent. This standard scrambled signal is routed to the headend combiner 30 where it is combined with the other channels, both the premium and basic, for transmission on the communications link 12. It is seen that, because a standard scrambled signal is used, the conventional converter/descramblers 34 may be used to descramble the premium channel.

In addition to the standard scrambling and modulation process, the scrambler contains an out of band frequency translator 216 which takes a portion of the IF sound carrier through a directional coupler 214 and converts it to an amplitude modulated data carrier which is not in the 6 MHz. bandwidth of the premium TV channel. This out of band data carrier is then combined with the standard scrambled signal via directional coupler 212 and routed to the headend combiner 30.

The data carrier is one of the frequencies chosen from the out of band carrier group as previously disclosed with respect to FIG. 3A. The frequency translator 216 comprises a mixer 218 and a fixed oscillator 220 which generates as its frequency one related to one of the selected out of band data carriers. The IF sound signal is thus frequency translated to a data carrier which is thereafter filtered in a bandpass filter 222 and linearly amplified by an amplifier 224. A final bandpass filter 226 is used to eliminate unnecessary components in the data carrier signal before combining it with the standard scrambled signal in the directional coupler 212. In this manner, the data and timing pulses are conveniently and efficiently included in band and out of band so that the conventional converter/descramblers 34 and the out of band descramblers 36 of the present invention can descramble them. In an extremely cost effective manner, the only extra components added at the transmission end to a standard scrambler processor are the two additional directional combiners 212, 214 and the data carrier translator 216 at each premium channel scrambler.

Figure 8:
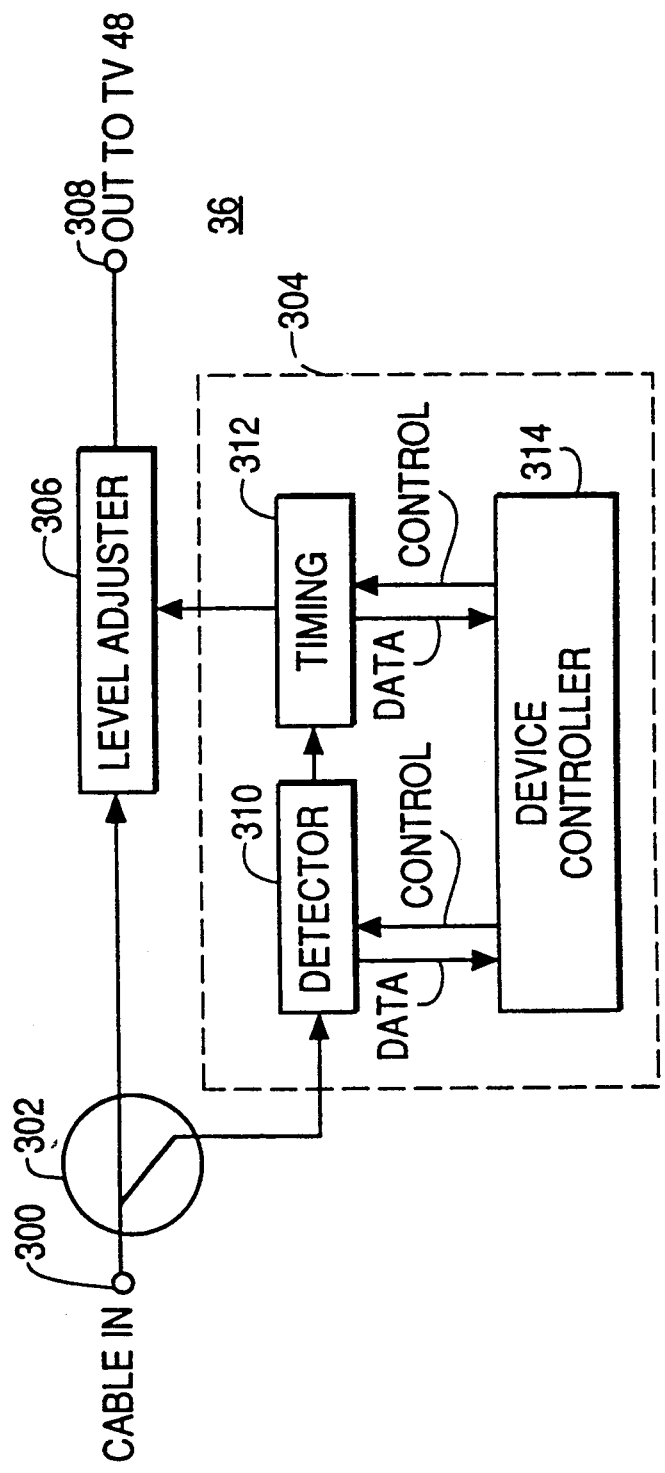
FIG. 8 is a detailed block diagram of an out of band subscriber terminal for the system illustrated in FIG. 1.

In FIG. 8, the subscriber terminal 36 is disposed between a distribution cable drop 300 and a cable ready television receiver 48 of the subscriber 14. The subscriber terminal 36 comprises a directional coupler 302 for splitting a portion of the broadband television system received from the drop to a device controller 304. This signal is for the detection and demodulation of the out of band timing and control information from the headend 10. From this timing and control information, the controller 304 controls a broadband level adjuster 306 to vary the amplitude of the broadband television signal. The broadband level adjuster 306 in the preferred implementation is a variable impedance device controlling either the gain or attenuation of the broadband television signal.

The descrambler controller 304 controls the level adjuster 306 in one of two modes, either a descrambling mode or a basic cable mode. If the terminal is in a basic cable mode then the level adjuster 306 is set to a zero gain or zero attenuation state to allow the broadband television signal to essentially pass through the device without modification. This allows the subscriber to watch the non-premium channels without the signal degradation of a second tuner. Because in this mode the subscriber terminal 36 is transparent to a video cassette recorder 46 or a cable ready television receiver 48 of the subscriber, the subscriber equipment configuration to watch one channel and record another can be standard. The tuning of a particular channel is accomplished by the tuner of the VCR 46 or TV 48.

If the subscriber terminal 36 is in the descrambling mode, the broadband level adjuster 306 is used to reestablish the correct level for the synchronization pulses which were suppressed by the scrambler. The level adjuster 306 descrambles by one of the methods disclosed in FIGS. 5 and 6 as will be more fully described hereafter.

Figure 9:
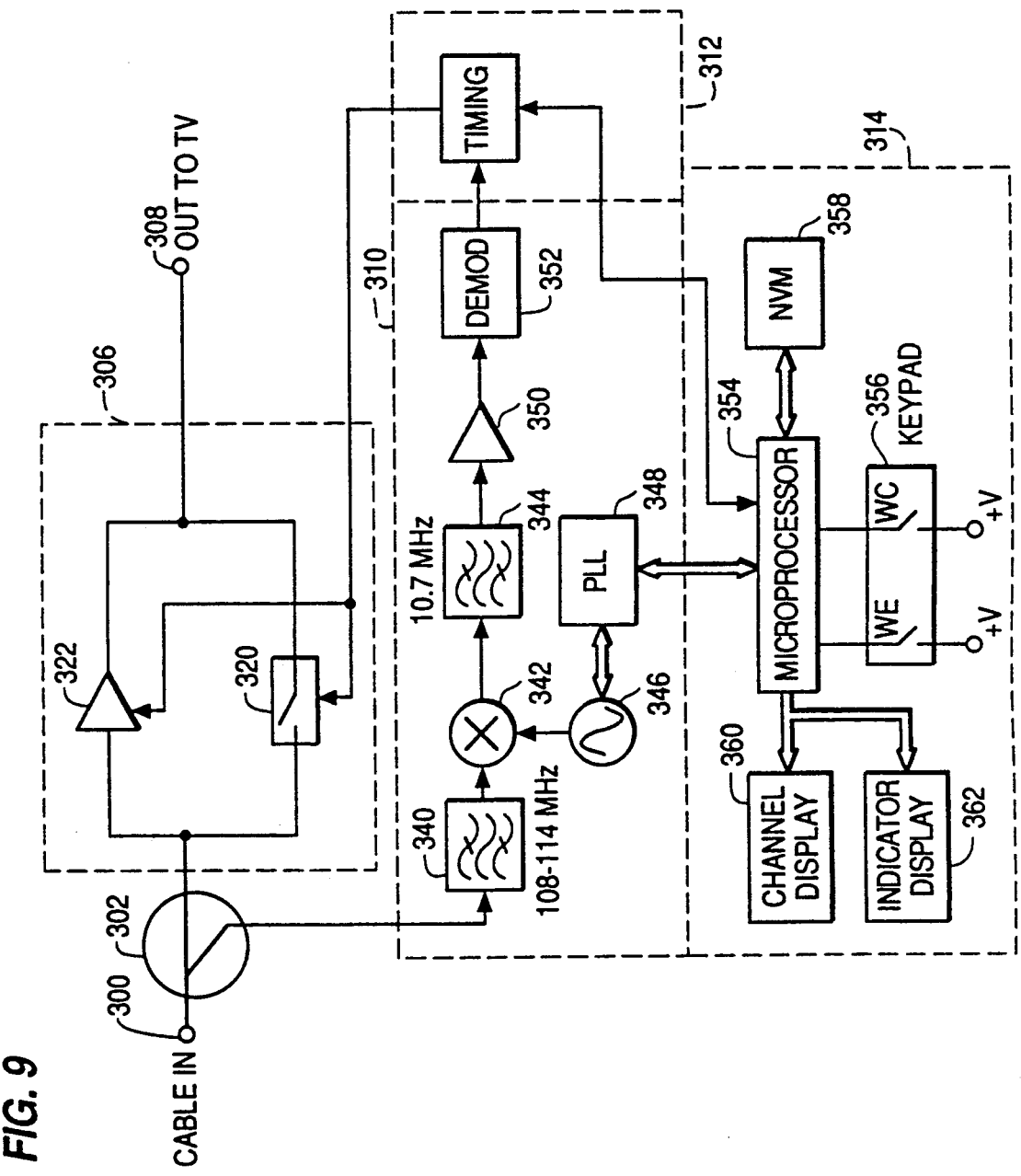
FIG. 9 is a more detailed block diagram of the subscriber terminal of FIG. 8 illustrating one preferred embodiment for the level adjuster.
Figure 10:
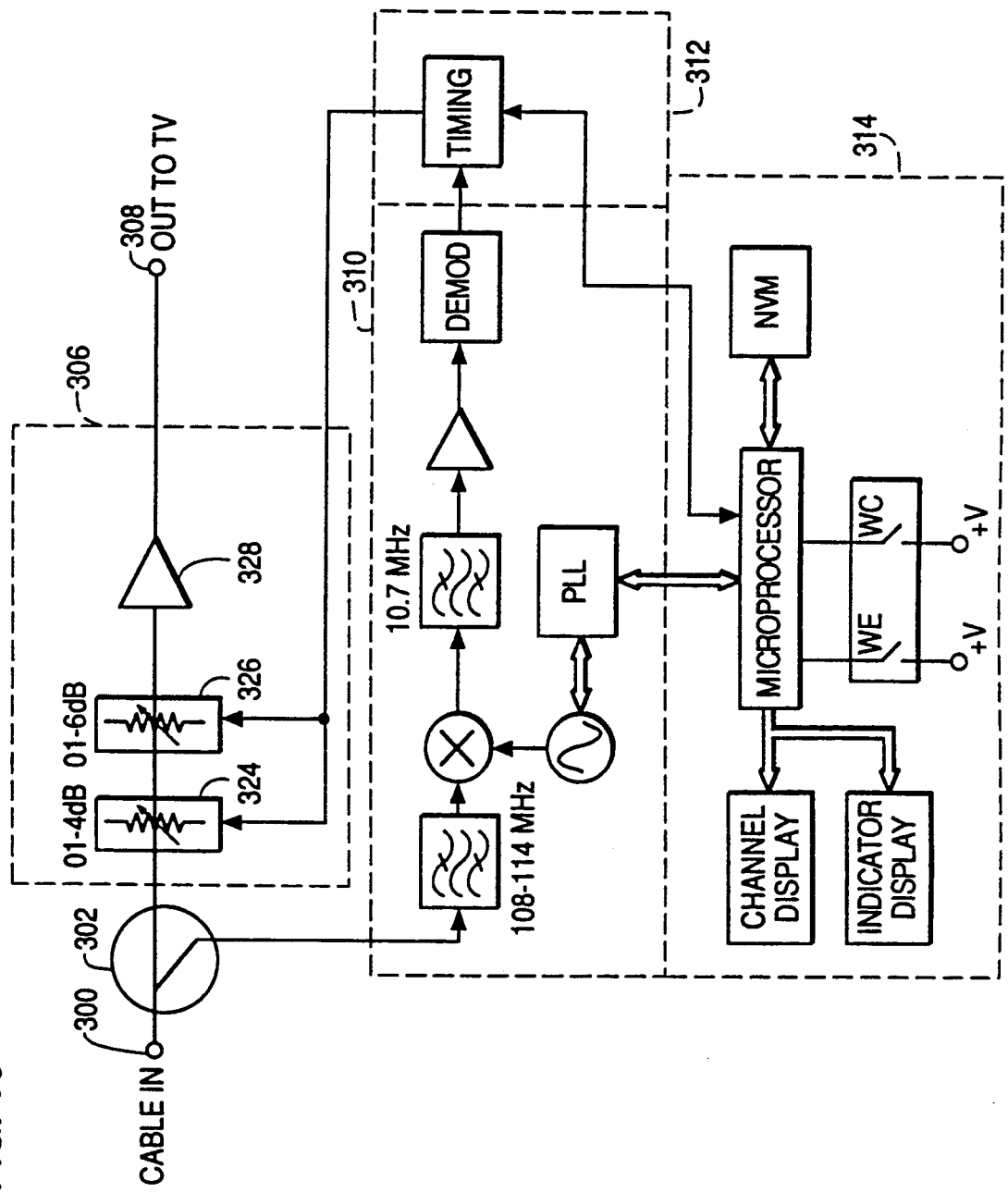
FIG. 10 is a more detailed block diagram of the subscriber terminal of FIG. 8 illustrating another preferred embodiment for the level adjuster.

There are at least two preferred configurations for the level adjuster 306 which are shown respectively in FIGS. 9 and 10. In FIG. 9, the level adjuster comprises two parallel paths where, in the first path, a switch 320 is closed or opened to allow the broadband television signal to pass through it or to be blocked, respectively. In the second path, an amplifier 322 is switched between off and a predetermined gain level. If the descrambler 36 is in the basic cable mode, then switch 320 is closed and the amplifier 322 is turned off. The broadband television signal passes through the switch 320 without modification. If the descrambler is in the descrambling mode, the switch 320 is opened and closed and the amplifier 322 is switched between off and its predetermined gain setting.

When the amplifier is switched to a predetermined gain level, the broadband television signal will pass through it and be modified by the gain. During active video portions of the television signal, the switch 320 is closed and the amplifier 322 is turned off. When the synchronization intervals occur, the gain of the amplifier 322 is adjusted with the restoration pulses to reestablish the correct levels for the synchronization pulses. This operation of the embodiment of the level adjuster corresponds to the method described in FIG. 5.

In FIG. 10, the level adjuster 306 comprises a series configuration of a first switched attenuator 324 having a 0 to 4 dB attenuation characteristic and a second switched attenuator 326 having a 0 to 6 'dB attenuation characteristic. The first attenuator 324 is connected in series with the second attenuator 326 in the broadband television signal path to allow a selectable attenuation of 0 dB, 4 dB, 6 dB, or 10 dB. Completing the serial path is an amplifier 328 for buffering the output of the two attenuators 324 and 326 and reestablishing the amplitude level of the entire descrambled signal. The amplifier 328 has a nominal gain of ±7.5 dB and is normally on in the path of the broadband television signal.

In the basic cable mode, the attenuators 324, 326 are switched to a fixed attenuation state and the broadband television signal is passed through the level adjuster 306 substantially unmodified. For example, the 4 dB attenuator can be switched off and the 6 dB attenuator switched on. This provides a nominal net path gain of approximately +1.5 dB when the +7.5 dB gain of the amplifier is taken into account. Because the signal attenuation of the directional coupler is approximately +1.5 dB, the actual net path gain is substantially 0 dB. When, however, the descrambling mode is used, the attenuators 324, 326 are switched to a predetermined level, usually −6 dB, during the active video portion of the television signal and turned off during the synchronizing times. This action adjusts the active video level relative to the synchronization pulses to reestablish the correct relationship between them. The amplifier then reestablishes the gross level. The operation of the level adjuster in FIG. 9 thus employs the broadband descrambling method described with respect to FIG. 6.

A detailed block diagram of the detector 310, timing circuit 312, and device controller circuitry 314, for the out of band descrambler 36 is more fully illustrated in FIGS. 9 and 10. Because the two embodiments differ only by the method of descrambling the broadband television signal only one of the detailed block diagrams will be described. It will be understood that similarly referenced circuitry in both embodiments operates identically. In FIG. 9, the detector 310 is used to detect one of the data carriers of the out of band carrier group. After the data carrier is detected it is demodulated to strip it of timing and data signals which are transferred to the timing circuit 312. The timing circuit 312 is under control of the device controller 314 and regulates the level adjuster 306 with the timing pulses to restore the sync levels to their previous amplitude.

In a preferred embodiment of the detector 310, a bandpass filter 340 is used to separate all of the out of band data carriers from the broadband television signal. The filter 340 passes the 108-114 MHz. channel to capture all of the data carriers which were transmitted from the headend. The particular data carrier and the associated channel are selected by tuning a local oscillator 346. The local oscillator 346 is tuned to a frequency which when mixed with a chosen data carrier will produce a common intermediate frequency of 10.7 MHz. The intermediate frequency produced by the selected data carrier is filtered by the bandpass filter 344 centered at the intermediate frequency of 10.7 MHz. The intermediate frequency for the data carrier is amplified in an amplifier 350 and then amplitude demodulated by a demodulator 352. The local oscillator is controlled to select a particular data carrier by a phase lock loop 348 which is under control of the device controller 314. The demodulator 352 is a standard AM detector which separates the amplitude modulated timing pulses and data pulses from the selected data carrier.

The device controller 314 which includes a microprocessor 354 controls the phased lock loop 348 by outputting a digital word to the device representative of the particular data carrier frequency (channel) which is to be selected. In the present system there are eight data carriers and the microprocessor 354 has at least one data carrier tuned at all times. The microprocessor 354 through the timing circuit 312 receives the authorization and command data pulses at all times and is able to determine when a programming event for the particular out of band descrambler (subscriber) is authorized, when it is to take place, and when it is over.

The microprocessor 354 further controls a channel display 360 and an indicator display 362 to alert the subscriber 14 of the pendency of a authorized event and other information. The subscriber 14 may choose to descramble the authorized event or to watch basic cable by means of a key pad 356. The microprocessor 354 contains in a conventional configuration a read only memory storing a software system program which provides the requisite functions to control the described hardware. The microprocessor 354 further communicates with a nonvolatile memory 358 where it stores the authorization data which it receives from the detector 310 and timing circuit 312. The nonvolatile memory 358, typically electrically erasable read only memory (EEPROM), is a means for allowing the descrambler 36 to maintain the authorization data even in the event of a power outage.

Figure 11:
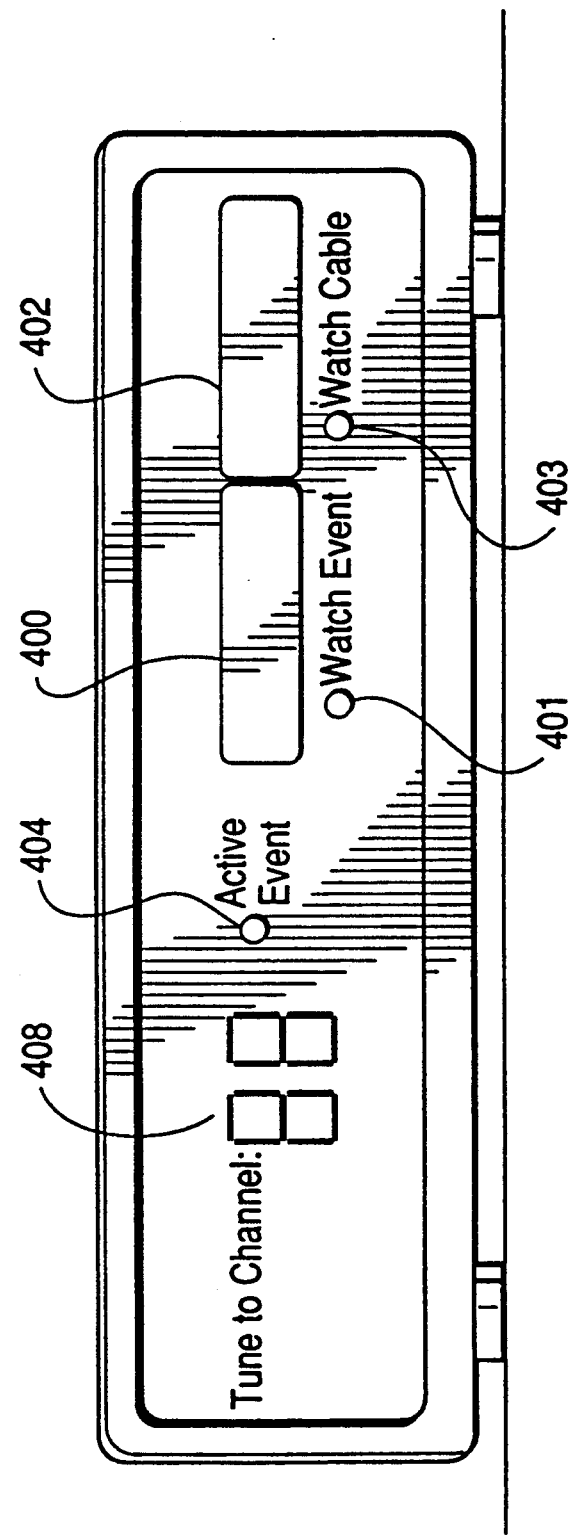
FIG. 11 is a pictorial representation of the front panel of the subscriber terminal illustrated in FIGS. 8-10 illustrating the subscriber interface to the device.

FIG. 11 is illustrative of a preferred interface between the subscriber 14 and the descrambler 36 of the present invention. The interface includes two push button switches 400, 402, one labeled WATCH EVENT and the other WATCH CABLE. Each switch 400 and 402 has associated with it an LED 401 and 403 to indicate when that respective state is active. The interface further comprises a display which has two 7-segment display digits 408 and a single LED indicator 404 which is labeled ACTIVE EVENT. The subscriber is required to only operate two switches and interpret the minimal display to be able to operate the terminal. This reduces learning time when the equipment is installed and the complexity of dealing with another apparatus.

Figure 12:
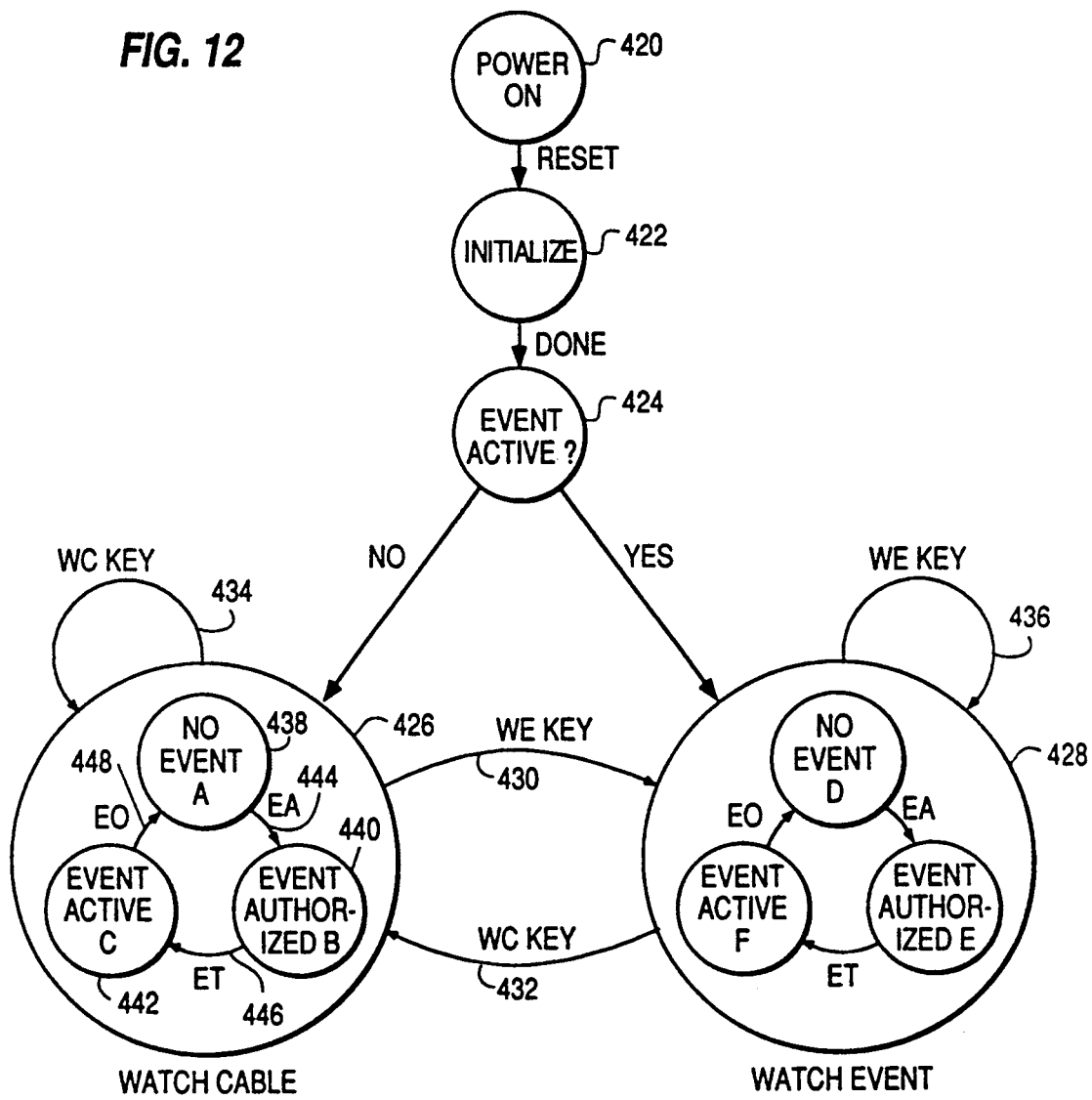
FIG. 12 is a state flow chart of the software which operates the microprocessor of the subscriber terminal illustrated in FIGS. 8-10.

FIG. 12 is a detailed state diagram of the operation of the device controller 314 for the terminal 36. After the microprocessor powers up or is reset according to block 420, an initialization process in block 422 takes place. The initialization process includes resetting all the controlled devices to default states and then checking for an active event in block 424. Based on whether an event is active or not, the device controller will enter one of two main states in blocks 426 or 428. Block 426 is the WATCH CABLE mode where the broadband television signal is essentially passed unmodified through the terminal 36 to the television receiver. The WATCH EVENT mode in block 428 is where an authorized event is broadband descrambled upon the start of the event.

The device controller is programmed to transfer the device to one of these modes depending upon the event active status in block 424. This permits the restart of the system in the WATCH EVENT mode in case the microprocessor is accidentally reset by a temporary power outage or by unplugging it during an event. If an event is active while this occurs, the path from block 424 to 428 will reinstate the terminal 36 in the WATCH EVENT mode and the programming will be descrambled as though the reset did not occur.

The terminal 36 transfers between the two modes by the subscriber pressing the WATCH EVENT key through path 430 or the WATCH CABLE key through 432. The key for the mode other than the current one causes a transition between them. If the WATCH CABLE key is pressed during the WATCH CABLE mode, such as in path 434, or the WATCH EVENT key is pressed while the WATCH EVENT mode is active, such as in path 436, then the mode for the device will not be changed.

Within each main state 426 and 428, there are three substates depending upon whether there is no event 438, an event has been authorized 440, or an event has been authorized and is now active 442. Within a state 426, for example, such as WATCH CABLE, the transitions among the substates occur in a circular fashion caused by conditions where an event becomes authorized 444, an event becomes active 446, and an event is over 448. The occurrence of the event authorized condition causes the terminal to change from the no event substate 438 to the event authorized substate 440. The occurrence of the event time condition ET causes a change from the event authorized substate 440 to the event active substate 442. After the event is over as sensed by the occurrence of the event over condition EO, the no event substate 438 is again entered from the event active substate 442.

Figure 13:
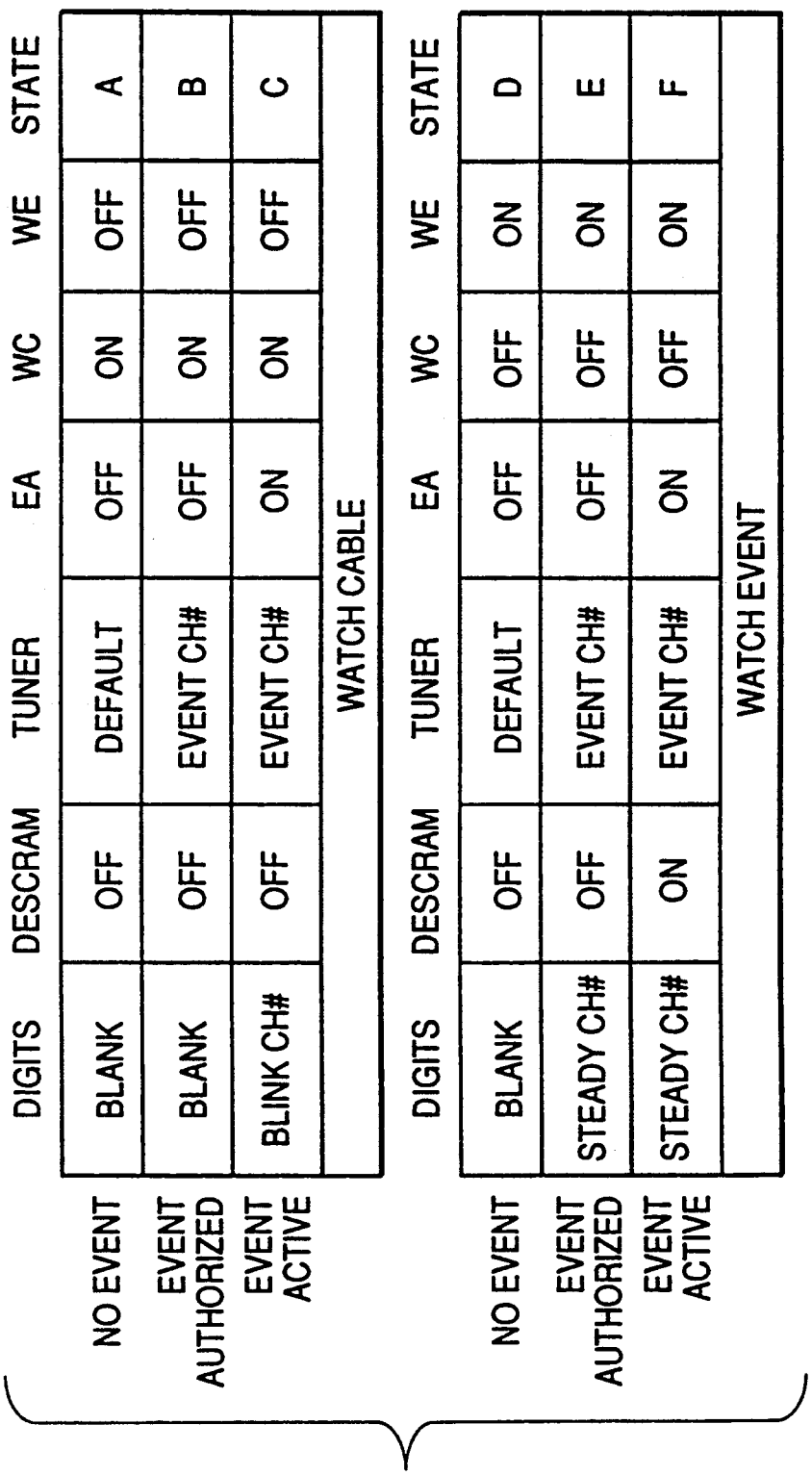
FIG. 13 is a tabular representation of the operational condition of the various devices of the subscriber terminal for the main states and substates illustrated in FIG. 12.

Upon a transition from one substate to another substate, or from one state to the other, the device controller performs certain hardware operations to control the operation status of the connected equipment. The table in FIG. 13 illustrates the states of the peripheral hardware upon any transition. If a particular substate is presently active and the device controller is moved to the other major state, then that same substate will be active. For example, if the device controller is in the WATCH CABLE state and the event authorized substate, a WATCH EVENT key will cause a transition of the apparatus to the WATCH EVENT state and the event authorized substate.

Because there are two major states, and three substates for each, table 13 shows that there are six substates A-F that the device can be in at any one time. Normally, the descrambler 36 will be in the dormant or basic cable mode of operation and the subscriber 14 will be receiving non-premium channels. No event will be authorized and substate A will be active. The display digits will be blank and all indicators, except the watch cable indicator, will be off. The tuner will be tuned to a default carrier, usually the lowest carrier in the group of eight. When an event becomes authorized, the substate changes from A to B where the channel data carrier frequency is tuned, but no other indication is given to the subscriber. When an authorized program is about to occur the substate changes from B to C where the ACTIVE EVENT indicator 404 will begin to blink thereby alerting the subscriber to select the event. The channel frequency of the event which is about to occur will be blinked on the seven-segment display 408.

The subscriber will then tune his VCR 46 or TV 48 to the channel on which the event is being broadcast. The subscriber selects the event by pushing the WATCH EVENT push button 400. This causes a change of the substates from C to F where the digit display will now show the channel of the event steady and the watch event indicator will be on. The substate change will also begin the process of descrambling the selected event so that it will be viewable for the subscriber.

When the authorized program is finished, the descrambler 36 will revert automatically from substate F to the no event substate D. To reenter the basic cable mode where non-premium channels can be watched the subscriber presses the watch cable button 402 which transfers the device from substate D to substate A. Whenever the subscriber terminal 36 is in the descrambling mode (substate F) and the subscriber wants to watch non-premium channels, he may push the WATCH CABLE push button 402 which transfers him to substate C. To reenter the descrambling mode, at least one premium program must be authorized at the time of pressing the WATCH EVENT push button 400. Substate E is entered when an event has been authorized and the subscriber has pressed the watch event push button 404. The channel number of the event will be displayed in a steady manner to notify the subscriber that the authorization has been made and received by the terminal.

The authorization of a programming event is caused by the receipt of authorization data by the microprocessor from the headend. The headend is notified that the subscriber wants to watch a particular programming event. The notification can take many different forms such as mailing a preprinted form, prepurchasing a set number of events at particular times, or a telephone call to the cable operator. Any form of notification compatible with the present system can be used. The headend generates authorization data addressed to a particular terminal by means of the data pulses on the out of band carrier. These pulses are demodulated by the detector and the timing circuit and then read in byte form by the microprocessor. If a particular event authorization is directed to the terminal, the microprocessor will set an event authorized bit in the NVM and transfer the terminal to an event authorized substate. When the event actually occurs, another transaction data stream is output from the headend which is addressed to the terminal. The data is decoded as before and the address of the message checked against the identification for the terminal. If the addresses match and the event authorization bit is set in the NVM, then the terminal will set an event active bit in the NVM and transfer the terminal to an event active substate. In addition, when the event is over, the headend will send out another transaction data stream indicating the device should be put back into the no event substate.

While the preferred embodiments of the invention have been shown and described, it will be obvious to those skilled in the art that various modifications and changes can be made to the invention without departing from the spirit and scope of the invention as hereinafter defined in the appended claims.

What is claimed is:

1. A subscription television system including:
   means for encoding a plurality of television channels forming a broadband television signal by suppressing the level of synchronization pulses and by generating an associated timing pulse stream relative to the synchronization intervals of each television channel;
   means for modulating a plurality of data carries with said plurality of timing pulse streams;
   means for transmitting said sync suppressed television channels and said data carriers over a communications link; and
   means for decoding at least one of the encoded television channels by detecting and demodulating a selected data carrier to obtain the associated timing pulse stream of one of the television channels and by varying the amplitude of said broadband television signal in accordance with said associated timing pulse stream thereby restoring the level of the synchronization pulses of the at least one encoded television channel.

2. A method of scrambling and descrambling a plurality of television channels forming a broadband television signal including the steps of:
   suppressing the synchronization pulses of a plurality of television channels;
   generating associated streams of timing pulses related to the synchronization intervals of said sync suppressed television channels;
   modulating said associated timing pulse streams on a plurality of data carriers;
   transmitting said broadband television signal and said plurality of data carriers over a communication link;
   selecting a data carrier and demodulating the associated data timing pulse stream; and
   varying the amplitude of said broadband television signal in accordance with said selected timing pulse steam to descramble the associated television channel.

3. A sync suppression scrambling apparatus for television signals comprising:
   means for encoding three or more television channels by suppressing the leel of synchronization pulses in each television channel and by generating an associated timing pulse stream relative to the synchronization intervals of each television channel;
   means for modulating three or more out-of-band data carriers with said plurality of streams of timing pulses, said data carries each having a frequency between 108 MHz and 114 MHz; and means for transmitting said encoded television channels and said data carriers over a communication link.

4. A method of sync suppression scrambling for television signals comprising the steps of:

encoding three or more channels by suppressing the level of synchronization pulses in each television channel and by generating an associated timing pulse stream relative to the synchronization intervals of each television channel;

modulating three or more out-of-band data carriers with said plurality of streams of timing pulses, said data carriers each having a frequency between 108 MHz and 114 MHz; and transmitting said encoded television channels and said data carriers over a communication link.

5. A descrambler for descrambling at least one of a plurality of sync suppressed television channels forming a broadband television signal comprising:

means for detecting and demodulating a selected data carrier signal from a plurality of data carrier signals to obtain an associated timing pulse stream; and means for varying the amplitude of said broadband television signal in accordance with said recovered timing pulse stream thereby restoring the level of said synchronization pulses of the associated television channel.

6. A method of descrambling at least one of a plurality of sync suppressed television channels forming a broadband television signal comprising:

detecting and demodulating a selected data carrier signal from a plurality of data carrier signals to obtain an associated timing pulse stream; and varying the amplitude of said broadband television signal in accordance with said recovered timing pulse stream thereby restoring the level of said synchronization pulses of the associated television channel.

7. An event terminal for a subscriber which can be used to selectively view either authorized encoded television programs or unencoded television programs from a subscription television system transmitting a broadband television signal having a plurality of encoded and unencoded channels, said even terminal comprising:

means for switching between a first path which comprises means for applying a decoding signal to the broadband television signal and a second path which does not provide for the application of a decoding signal to the broadband television signal;

means for receiving authorization data which indicates whether the subscriber is authorized to view one or more of said encoded channels; and means for controlling said means for switching in response to said authorization data to apply said decoding signal to the broadband television signal when authorized, thereby decoding at least one of said encoded television channels, and to inhibit application of the decoding signal to the broadband television signal when not authorized.

* * * * *